Figure 1:
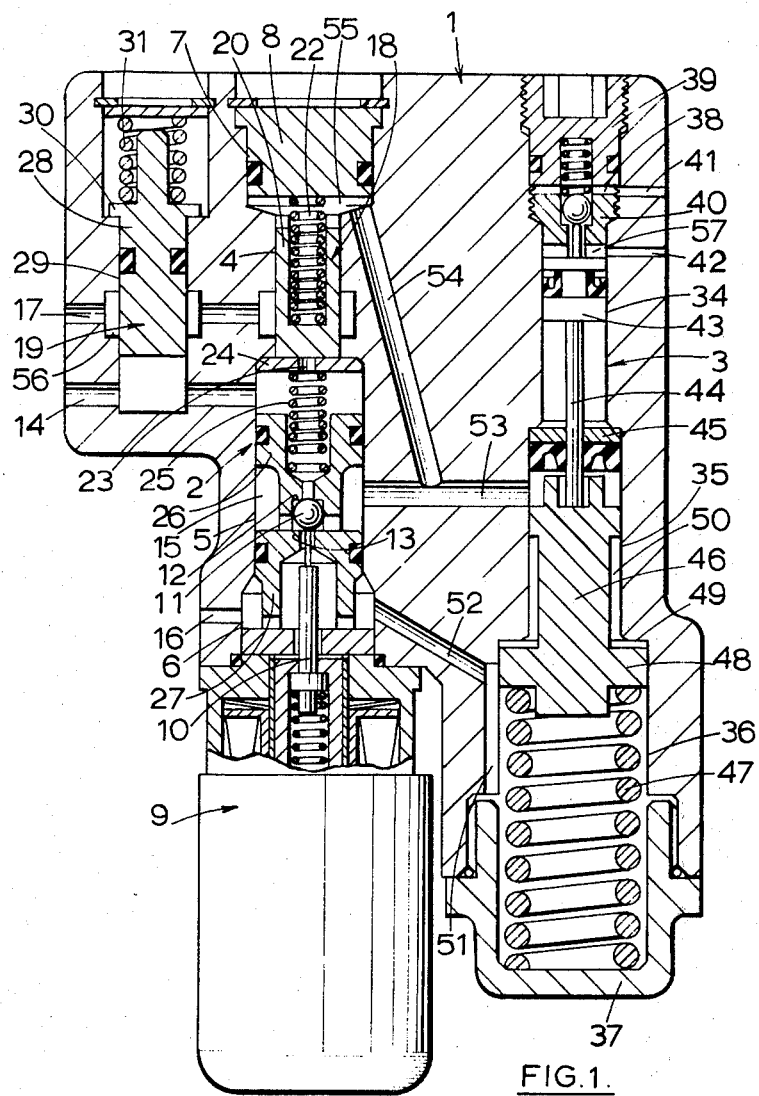

United States Patent [19]
Farr

[11] 3,994,538
[45] Nov. 30, 1976

[54] HYDRAULIC CONTROL VALVE ASSEMBLIES FOR VEHICLE ANTI-SKID BRAKING SYSTEMS

[75] Inventor: Glyn Phillip Reginald Farr, Leek Wootton, England

[73] Assignee: Girling Limited, Birmingham, England

[22] Filed: Jan. 26, 1976

[21] Appl. No.: 652,520

[30] Foreign Application Priority Data
Jan. 28, 1975 United Kingdom............... 3563/75

[52] U.S. Cl. ............................................. 303/21 F
[51] Int. Cl.² ......................................... B60T 8/10
[58] Field of Search ........... 303/113, 115, 116, 119; 188/181 A

[56] References Cited
UNITED STATES PATENTS

| | | | |
|---|---|---|---|
| 3,666,328 | 5/1972 | Williams | 188/181 A X |
| 3,671,085 | 6/1972 | Pasek et al. | 188/181 A X |
| 3,806,206 | 4/1974 | Tribe et al. | 303/115 |

*Primary Examiner*—George E. A. Halvosa
*Attorney, Agent, or Firm*—Scrivener Parker Scrivener and Clarke

[57] ABSTRACT

An hydraulic control valve assembly for a vehicle anti-skid braking system incorporates a modulating piston for modulating the supply of hydraulic fluid between communicating ports in a housing, and a compression spring normally urges the modulator piston into an inoperative position. The housing is provided with an additional outlet port for connection to a reservoir for fluid and an anti-skid control valve assembly normally places opposite faces of the modulator piston in communication with the additional outlet port. In response to a skid control signal the anti-skid control valve assembly is operative to isolate the opposite faces of the modulator piston from each other and subsequently place the one face opposite the compression spring in communication with a first inlet port in the housing.

3 Claims, 2 Drawing Figures

HYDRAULIC CONTROL VALVE ASSEMBLIES FOR VEHICLE ANTI-SKID BRAKING SYSTEMS

This invention relates to a new or improved hydraulic control valve assembly for vehicle anti-skid braking systems of the kind comprising a housing having a first inlet port for connection to power steering pump, a first outlet port for connection to power steering means and communicating with the first inlet port, a second inlet port for connection to brake pressure generating means, and a second outlet port for connection to at least one wheel brake, a modulator piston working in a bore in the housing for modulating the supply of hydraulic fluid from the second inlet port to the second outlet port, the modulator piston being movable between a first inoperative position in which substantially unrestricted communication between the second inlet port and the second outlet port is permitted and a second operative position in which at least communication between the second inlet port and the second outlet port is cut-off, resilient means normally urging the modulator piston into the first position, and anti-skid valve means operative in response to a skid control signal to subject the piston to a net hydraulic pressure in a direction opposite to said resilient means and of a magnitude sufficient to urge said modulator piston into the said operative position against the force of said resilient means when the deceleration of the braked wheel exceeds a predetermined value.

In one known control valve assembly of the kind set forth the first inlet port communicates with first outlet port through the anti-skid valve means which are normally open so that opposite faces of the modulator piston are in communication with the first inlet port and, when installed in a braking system, the first port is also connected to a reservoir for fluid downstream of the power steering means, the face remote from the resilient means being in direct communication at all times with the first outlet port, and the opposite face being in indirect communication with the first inlet port through the anti-skid valve means and a passage connected to the first outlet port. Thus the opposite faces of the modulator piston are normally subjected to positive hydraulic pressures so that, when operative, the anti-skid valve means close to isolate the opposite faces of the modulator piston, and the piston can move into the retracted position only after the pressure acting on the said one face of the piston has increased to a value sufficient to overcome the resilient means plus the force of the pressure acting on the opposite face of the piston. During closure of the anti-skid valve means and before a by-pass valve can open, flow of hydraulic fluid to the first outlet port, and in consequence the power steering means, is cut-off. Also friction opposing movement of the piston in the bore is increased due to the effect of the increase in pressure acting on the said one face.

According to our invention in a control valve assembly of the kind set forth the housing is provided with a third additional outlet port for direct connection to a reservoir for fluid and the anti-skid valve means normally places opposite faces of the modulator piston in communication with the third outlet port, the anti-skid valve means being operative in response to the skid control signal to isolate the opposite faces of the modulator piston from each other and subsequently place the one face opposite the resilient means in communication with the first inlet port whereby the modulator piston is moved into the said operative position.

This has the advantage that only a small proportion of the pressure at the first inlet port is diverted to move the piston into the said operative position. Thus the remainder will still be available for the power steering means. Since the opposed faces of the piston are normally at atmospheric pressure, it is not necessary to provide a seal between the piston and the bore. Thus no increase in the frictional resistance to movement of the piston will occur when the said one face is placed in communication with the first inlet port.

Preferably the modulator piston is of differential outline and the bore is correspondingly stepped, the resilient means comprising a pre-loaded spring acting on the end of the piston which is of greater area to hold the piston in the inoperative position defined by the engagement of a shoulder at the step in diameter of the piston with a shoulder at the step in diameter of the bore, and the end of smaller area being exposed to the pressure at the first outlet port when the anti-skid valve means is operative in response to the control signal.

Conveniently part of the portion of the modulator piston which is of smaller area and the portion of the bore which is of greater area are cut away to define between the piston and bore a damping chamber in which hydraulic fluid is trapped to act as a damper and restrict the rate at which the modulator piston is returned to its inoperative position at the termination of a skid control signal when the opposite faces of the piston are again exposed to the third outlet port at atmospheric pressure.

Figure 2:
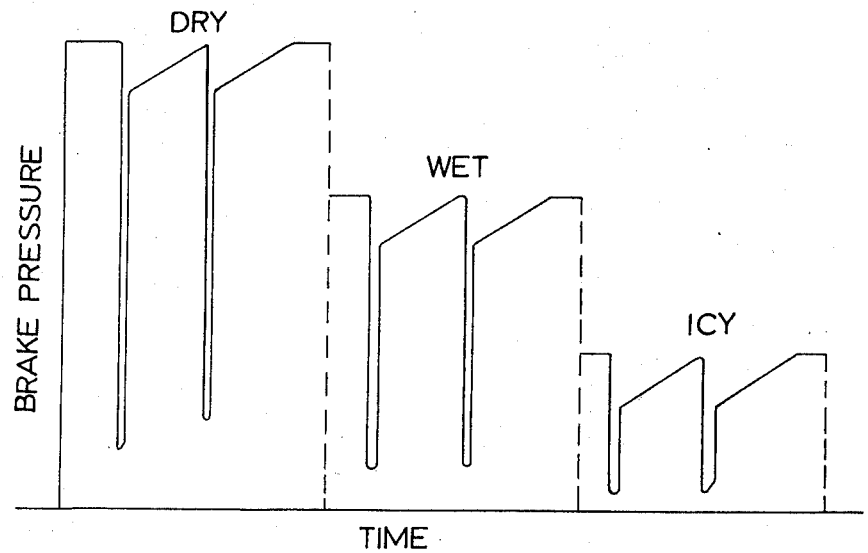

One embodiment of our invention is illustrated in the accompanying drawings in which:

FIG. 1 is an hydraulic control valve assembly for a vehicle anti-skid braking system; and FIG. 2 is a graph of brake pressure against time utilising the control valve assembly of FIG. 1 and comparing three different road conditions.

The hydraulic control valve assembly of FIG. 1 comprises a housing 1 provided with two spaced parallel longitudinally extending bores 2 and 3. The bore 2 is provided with bore portions 4, 5, 6 of progressively increased diameters, and the free end of the portion 4 of smallest diameter leads into a bore portion 7 which is closed by a plug 8 of an axial length less than that of the bore portion 7.

Anti-skid control valve means comprising a solenoid-operated valve 9 installed in the housing 1 with a spring-loaded solenoid-operated operating member 10 controlling the engagement of a valve member 11 in the form of a ball between a pair of axially spaced seatings 12 and 13 in the bore portion 5. The seating 12 is disposed between a first inlet port 14 in the housing, for connection to a high pressure steering pump, and a servo-chamber 15 defined between the seatings, and the seating 13 is located between the servochamber 15 and port 16 (third outlet port) in the housing and communicating with the bore portion 6. The inlet port 14 also communicates with an outlet port 17 (first outlet port) for connection to power steering means through a by-pass valve 18 and a pressure relief valve 19 in parallel with the by-pass valve 18.

The by-pass valve 18 comprises a spool 20 working in the bore portion 4 in which the port 17 is located and urged by a spring 22 in an inward direction to cut-off communication through an orifice 23 in a plate 24 which works in the bore portion 5 and which is urged in the opposite direction by a spring 25. The spring 25 also acts normally to urge a piston 26 containing the seating 12 into engagement with a stop member 27 containing the seating 13.

The pressure relief valve 19 comprises a piston 28 which works in a bore 29 traversing the ports 17 and 14 with the piston 28 carrying an enlarged head 30 which projects into a counterbore at the end of the bore 29 remote from the port 14. A spring 31 normally urges the piston 28 inwardly to isolate the port 14 from the port 17.

The bore 3 is also provided with bore portions 34, 35 and 36 of progressively increased diameters with the portions 36 of greatest diameter being located at the same end of the housing 1 as the solenoid-operated valve 9 and being closed by an end closure cap 37. The free end of the bore portion 34 of smallest area leads into chamber 38 of enlarged area which is closed by a plug 39 and a spring-loaded valve assembly 40 is located in the chamber 38 to control communication between a second inlet port 41 for connection to an hydraulic master cylinder and communicating with the chamber 38 and a second outlet port 42 communicating with the bore portion 34 for connection to a wheel brake. Operation of the valve assembly 40 is controlled by an expander piston 43 which works in the bore portion 34 and is carried by a piston rod 44 which in turn works through an opening in a sealed guide 45 closing the end of the bore portion 34 remote from the valve assembly 40.

A modulator piston 46 of stepped outline works in the bore portions 35 and 36 and engages at its inner end of smaller area with the piston rod 44. A preloaded spring 47 acts on the end of the piston 46 which is of greater diameter to urge it into an inoperative advanced position in which the expander piston 43 is similarly advanced to hold the valve assembly 40 open. The said inoperative advanced position is defined by the engagement of a shoulder 48 at the step in diameter of the piston 46 with a stop comprising the step 49 between the bore portions 35 and 36. In this position an annular recess 50 in the wall of the piston 46 is sealed from a passage or relief 51 in the wall of the bore portion 36 by the engagement of the portion of the piston 46, which is of greater area, with the portion of the bore portion 36 between the bore portions 35 and the inner end of the relief 51.

An inclined passage 52 in the housing 1 connects the third outlet port 16 at all times to the relief 51, and the end of the piston 46 which is of smaller area is exposed to the servo chamber 15 through a passage 53 which thus forms a part of, or an extension to, the servo-chamber 15 itself. A further passage 54 connects the passage 53 and a chamber 55 between the plug 8 and the spool 18.

When the valve assembly is installed in an anti-skid vehicle braking system the first inlet port 14 is connected to a high pressure hydraulic steering pump, the first outlet port 14 is connected to power steering means, and the third outlet port 16 is connected to a reservoir for fluid downstream of the steering means and from which the pump draws fluid. The second inlet port 41 is connected to an hydraulic master cylinder, and the second outlet port 42 is connected to a wheel brake.

In a normal inoperative position with the pump operating, the solenoid of the valve 9 is de-energised and the operating member 10 holds the valve member 11 in engagement with the seating 12 and away from the seating 13. Thus, opposite ends of the modulator piston 46 and the chamber 55 are in communication with the reservoir, and the pump pressure holds the spool 18 away from the plate 24 so that hydraulic fluid is continuously pumped to the power steering means through an annulus 56 surrounding the piston 28.

Since the opposite ends of the piston 46 are in communication with the reservoir, which is at atmospheric pressure, the piston 46 is held in the inoperative advanced position as described above so that, when the master cylinder is operated, fluid is delivered through the open valve 40 to the second outlet port 42 and through an expander chamber 57 defined by the bore portion 34 between the piston 43 and the valve 40.

When the deceleration of the braked wheel exceeds a predetermined value, a control signal from anti-skid sensing means energises the solenoid of the solenoid-operated valve 9 to retract the operating member 10. This permits the valve member 11 to move away from the seating 12 and engage with the seating 13. Thus, the servo-chamber 15, the end of the modulator piston 46 which is of smaller area, and the chamber 55 are exposed to pump pressure. The modulator piston 46 is moved into an operative retracted position accompanied by corresponding movement of the expander piston 43. This allows the valve 40 initially to close to isolate the master cylinder from the brake, and thereafter to relieve the braking pressure by increasing the effective volume of the expander chamber 57. Opposite sides of the piston 26 are exposed to equal pressures so that high pressure fluid is still supplied to the outlet port 17 through the orifice 23.

As the braked wheel regains speed, the solenoid is de-energied so that the valve member 11 is again urged by the operating member 10 away from the seating 13 and into engagement with the seating 12. The servo-chamber 15 is again placed in communication with the reservoir so that the pre-loaded spring urges the modulator piston 46 into its inoperative retracted position with the result that the brakes are re-applied initially by pressurisation of the fluid in the expander chamber 57 by decreasing the effective volume thereof. Initial re-application of the brakes takes place rapidly until the portion of the piston 46 which is of greater area enters the portion of the bore portion 36 above the relief 51 to trap a volume of fluid within the recess 50. This forms a damping chamber to reduce the speed at which the piston 46 is returned to its inoperative retracted position, whereby the brake pressure is applied at a lower rate. For example, if a master cylinder pressure of 900 p.s.i. causes a wheel skid, the brake would be released until the wheels regained speed. Then the brakes would be re-applied to, say 800 p.s.i., and then further increased slowly under the control of the damping chamber and at a rate equivalent to the rate at which hydraulic fluid escapes from the damping chamber. This provides a very fine control of brake re-application. This has the advantage that, as shown in FIG. 2, the damped brake re-application becomes a higher percentage of the brake/time characteristic the lower the co-efficient of friction of the surface over which the vehicle is travelling.

If a skid condition is active and the steering gear is operated when the piston 20 had closed the orifice 23, the pressure acting on the piston 28 increases to a value sufficient to overcome the loading in the spring 31 and the piston 28 retracts to place the port 17 in direct communication with the port 17 to satisfy the requirements of the steering gear.

I claim:

1. An hydraulic control valve assembly for a vehicle anti-skid braking system, comprising a housing having a first inlet port for connection to power steering pump, a first outlet port for connection to power steering means and communicating with the first inlet port, a second inlet port for connection to brake pressure generating means, a second outlet port for connection to at least one brake for a wheel, and a bore, a modulator piston working in said bore in said housing for modulating the supply of hydraulic fluid from said second inlet port to said second outlet port, said modulator piston being movable between a first inoperative position in which substantially unrestricted communication between said second inlet port and said second outlet port is permitted and a second operative position in which at least communication between said second inlet port and said second outlet port is cut-off, resilient means normally urging said modulator piston into said first position, and anti-skid valve means operative in response to a skid control signal to subject said piston to a net hydraulic pressure in a direction opposite to said resilient means and of a mangitude sufficient to urge said modulator piston into the said operative position against the force of said resilient means when the deceleration of the braked wheel exceeds a predetermined value, wherein said housing is provided with a third additional outlet port for direct communication to a reservoir for fluid and said anti-skid valve means normally places opposite faces of said modulator piston in communication with said third outlet port, said anti-skid valve means being operative in response to said skid control signal to isolate said opposite faces of the modulator piston from each other and subsequently place the one face opposite to said resilient means in communication with said first inlet port whereby said modulator piston is moved into the said operative position.

2. A control valve assembly as claimed in claim 1, wherein said modulator piston is of differential outline and said bore is correspondingly stepped, said resilient means comprising a pre-loaded spring acting on the end of said piston which is of greater area to hold said piston in the inoperative position defined by the engagement of a shoulder at the step in diameter of said piston with a shoulder at the step in diameter of said bore, and the end of smaller area being exposed to the pressure at said first inlet port when the anti-skid valve means is operative in response to said control signal.

3. A control valve assembly as claimed in claim 1, wherein part of the portion of said modulator piston which is of smaller area and the portion of said bore which is of greater area are cut away to define between the piston and said bore a damping chamber in which hydraulic fluid is trapped to act as a damper and restrict the rate at which said modulator piston is returned to the said inoperative position at the termination of a skid control signal when the said opposite faces of said piston are again exposed to said third outlet port at atmospheric pressure.

* * * * *